No. 726,522. PATENTED APR. 28, 1903.
C. FOX & J. A. WATERS.
AUTOMATIC SHUT-OFF FOR GAS OR OIL.
APPLICATION FILED JAN. 26, 1903.
NO MODEL.
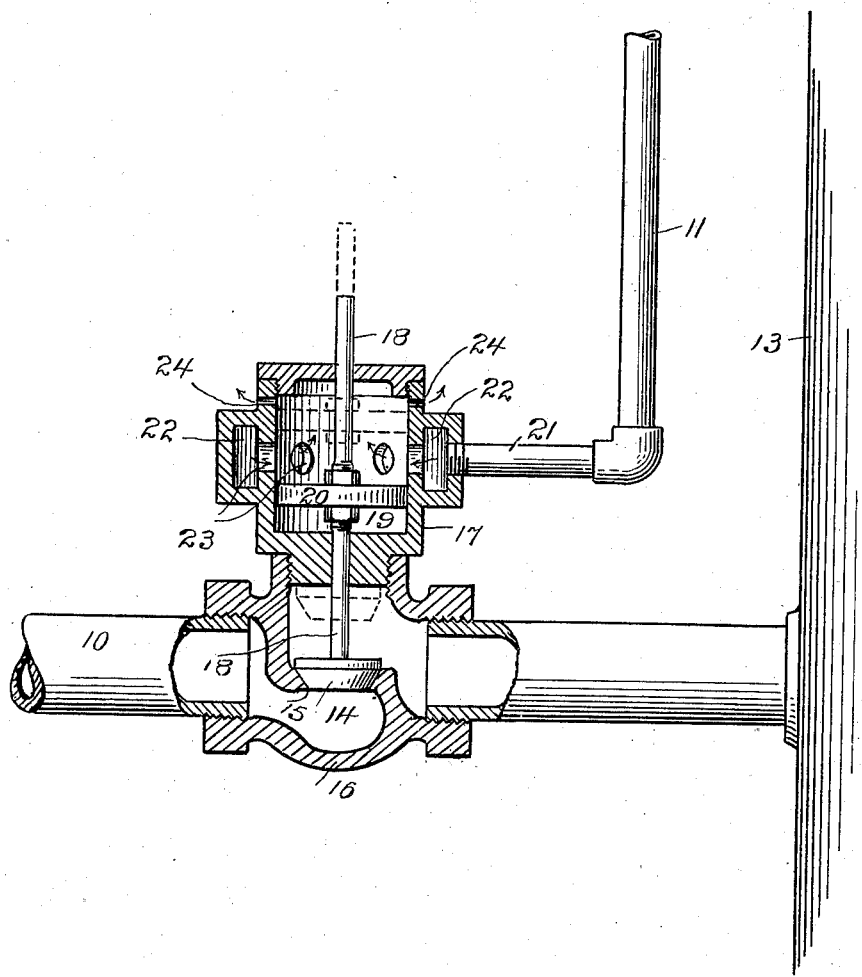
WITNESSES.
H. A. Lamb,
S. W. Atherton.
INVENTORS
Charles Fox and
John A. Waters
By A. M. Wooster, Atty.

UNITED STATES PATENT OFFICE.

CHARLES FOX AND JOHN A. WATERS, OF STAMFORD, CONNECTICUT.

AUTOMATIC SHUT-OFF FOR GAS OR OIL.

SPECIFICATION forming part of Letters Patent No. 726,522, dated April 28, 1903.

Application filed January 26, 1903. Serial No. 140,545. (No model.)

*To all whom it may concern:*

Be it known that we, CHARLES FOX and JOHN A. WATERS, citizens of the United States, residing at Stamford, county of Fairfield, State of Connecticut, have invented a new and useful Automatic Shut-Off for Gas or Oil, of which the following is a specification.

Our invention relates to furnaces and engines using either gas or oil for fuel, and has for its object to provide automatic means for shutting off the supply of fuel in the event of a stoppage of or serious interference with the air-supply.

With this end in view we have devised the novel automatic fuel shut-off which we will now describe, referring to the accompanying drawing, forming part of this specification, and using reference characters to indicate the several parts.

The view is a section of our novel shut-off complete, certain of the parts being shown in elevation.

It is of course well understood that in furnaces and engines using either gas or oil as fuel it is a matter of vital importance that the air-supply, which is usually from a blower, be uninterrupted; otherwise combustion of the fuel is incomplete, and unpleasant if not serious results are liable to follow unless the supply of gas or oil is immediately cut off.

It has heretofore been a source of inconvenience in using gas and oil as fuel for either engines or furnaces that should the blower-belt run off or anything happen to interfere with the air-supply escape of gas took place, and explosions frequently occurred where gas was used as fuel and flooding with oil took place where oil was used as fuel. These objections are wholly overcome by the use of our novel shut-off, and the flow of naphtha or oil is instantly shut off if the air-supply ceases or falls below a certain minimum pressure.

10 denotes a fuel-supply pipe, 11 an air-supply pipe, and 13 a furnace or engine where the mixed air and gas is consumed, it being wholly immaterial, so far as the principle of the invention is concerned, how the fuel and air are mixed and what use is made of the inflammable mixture.

14 denotes the disk, 15 the seat, and 16 the body, of a valve which is interposed between the fuel-supply pipe and the place of consumption.

17 denotes the body of our novel shut-off, which is located above and is rigidly secured to the valve-body. A stem 18 extends upward through a chamber 19 within the body of the shut-off and through the upper wall thereof for convenience in starting. Within chamber 19 and closely fitting the wall thereof is a disk 20, carried by the stem. An air-pipe 21 leads from the air-supply pipe to chamber 19. We preferably connect pipe 21 with a supplemental chamber 22, which surrounds chamber 19 and communicates therewith by a series of openings, (indicated by 23.) This construction is not essential, but is preferably adopted so as to cause air to enter the shut-off chamber from all sides instead of at a single opening.

The operation of the shut-off will be clearly understood from the drawing, in which the parts are shown in full lines in the operative or shutting-off position. This, however, is not the normal position of the parts in use, which is shown by dotted lines. In starting, the operator, having first turned on the air-supply and the fuel-supply, raises the disk above openings 23 by means of the stem, which raises the valve-disk from the seat and allows the fuel to pass and also permits air to enter the chamber through openings 23. The pressure of air in the chamber now acts to retain disk 20, and with it the valve-disk, in the raised position, as indicated by dotted lines, this being the normal position of the parts in use. The instant, however, that the air-pressure falls below a certain minimum, which is sufficient to hold disk 20, and with it the stem and valve-disk, at the raised position, said parts will drop by gravity to the closing position, as shown in full lines in the drawing, and the valve will instantly shut off the supply of fuel. The parts will remain in the operative or shutting-off position without regard to changes in the air-pressure until disk 20 and the valve-disk are raised again by the operator. Openings 24 are provided at the upper end of the chamber to permit air to escape when the disk is lifted, as in starting. Disk 20 of course fits closely in the chamber, making it practically airtight, so that air under normal pressure entering the chamber when the disk is at the raised position will retain it raised and so retain the valve in the open position.

Having thus described our invention, we claim—

1. A shut-off of the character described comprising a valve, a chamber above the valve, a disk in said chamber, an air-pipe communicating with the chamber and connections intermediate the valve and the disk, so that when the disk is raised above the air-pipe normal air-pressure will retain it there and keep the valve open, and when the air-pressure falls the disk will drop and close the valve.

2. A shut-off of the character described comprising a valve having a stem, a chamber through which the stem extends, a disk in said chamber carried by the stem and an air-pipe communicating with the chamber so that, when the disk is raised above the air-pipe, normal air-pressure will retain it there and keep the valve open, and when the air-pressure falls the disk and stem will drop by gravity and close the valve.

3. A shut-off of the character described comprising a valve having a stem, a chamber 19 through which the stem extends, a disk in said chamber carried by the stem, a supplemental chamber surrounding chamber 19 and communicating therewith and an air-pipe leading into the supplemental chamber, so that when the disk is raised, normal air-pressure will retain the disk in the raised position and the valve in the open position, and when the air-pressure falls, the disk and stem will drop by gravity and close the valve.

4. A shut-off of the character described comprising a valve having a stem, a chamber through and above which the stem extends, and which is provided with openings 24, a disk in said chamber carried by the stem, and an air-pipe communicating with the chamber, so that when the stem is raised, air in the upper portion of the chamber will pass out through the openings, after which normal air-pressure below the disk will keep the latter raised and retain the valve in the open position, a fall in the air-pressure causing the disk to drop by gravity and close the valve.

In testimony whereof we affix our signatures in presence of two witnesses.

CHARLES FOX.
JOHN A. WATERS.

Witnesses:
C. E. BOGARDUS,
P. J. CLARK.